United States Patent
Umezawa et al.

(10) Patent No.: US 6,916,558 B2
(45) Date of Patent: Jul. 12, 2005

(54) MAGNETIC DISK USING A GLASS SUBSTRATE

(75) Inventors: Teiichiro Umezawa, Tokyo (JP); Hiroshi Tomiyasu, Tokyo (JP); Keiji Moroishi, Singapore (SG)

(73) Assignees: Hoya Corporation, Tokyo (JP); Hoya Magnetics Singapore Pte. Ltd., Tuas Link (SG)

( * ) Notice: Subject to any disclaimer, the term of this patent is extended or adjusted under 35 U.S.C. 154(b) by 0 days.

(21) Appl. No.: 10/778,186

(22) Filed: Feb. 17, 2004

(65) Prior Publication Data

US 2004/0161577 A1 Aug. 19, 2004

(30) Foreign Application Priority Data

Feb. 17, 2003 (JP) .................................. 2003-038242

(51) Int. Cl.$^7$ .............. G11B 5/66; B32B 7/02
(52) U.S. Cl. ............. 428/694 TS; 428/212; 428/694 T
(58) Field of Search .................... 428/611, 651, 428/687, 65.3, 65.7, 694 T, 694 TS, 694 TR, 900, 694 SG, 928, 637, 675, 686, 216, 336, 694 TM, 695; 369/272, 277; 29/603.8, 603.13, 603.27

(56) References Cited

U.S. PATENT DOCUMENTS 6,544,893 B2   4/2003   Eto
6,586,116 B1 * 7/2003 Bian et al. .................. 428/651
6,759,148 B2 * 7/2004 Tanahashi et al. ........ 428/694 T
6,767,651 B2 * 7/2004 Uwazumi et al. ........... 428/611
6,777,112 B1 * 8/2004 Girt et al. ............ 428/694 TM
6,852,426 B1 * 2/2005 Girt et al. ............ 428/694 TM
2003/0138665 A1 * 7/2003 Kanbe et al. ......... 428/694 TM
2003/0152810 A1 * 8/2003 Kawai et al. .......... 428/694 TS
2003/0186086 A1 * 10/2003 Abarra et al. .......... 428/694 TS
2003/0219631 A1 * 11/2003 Takahashi et al. .......... 428/695

FOREIGN PATENT DOCUMENTS

JP   62-273619 A   11/1987
JP   2002-32909 A   1/2002

OTHER PUBLICATIONS

Translation: JPO 2002–032909 / Hironao et al/ Jan. 31, 2002.*

* cited by examiner

Primary Examiner—Stevan A. Resan
Assistant Examiner—Louis Falasco
(74) Attorney, Agent, or Firm—Sughrue Mion, PLLC

(57) ABSTRACT

In a magnetic disk having a glass substrate, an amorphous underlayer is formed on the glass substrate. A magnetic layer is formed on the amorphous underlayer. The glass substrate is provided with a texture formed to induce magnetic anisotropy in the magnetic layer. The amorphous underlayer contains a group IVa element on a glass substrate side and a group Va element on a magnetic layer side.

4 Claims, 1 Drawing Sheet

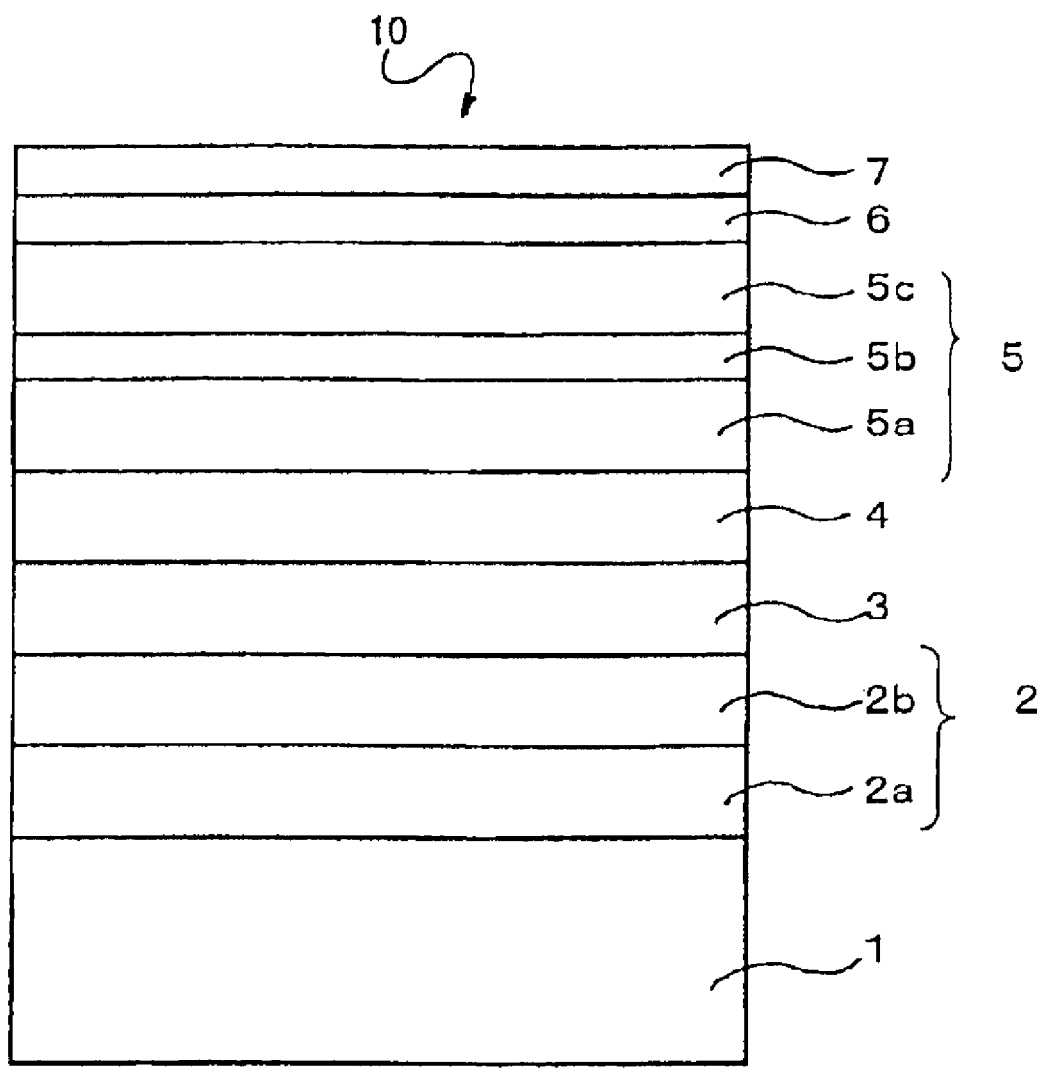

MAGNETIC DISK USING A GLASS SUBSTRATE

This application claims priority to prior Japanese application JP 2003-38242, the disclosure of which is incorporated herein by reference.

BACKGROUND OF THE INVENTION

This invention relates to a magnetic disk to be loaded in a magnetic disk apparatus, such as a hard disk drive.

Following the rapid development of the IT (information technology) industry in recent years, dramatic technical innovation is required in the information recording technology, in particular, in the magnetic recording technology. For example, in a magnetic disk to be loaded in a hard disk drive (hereinafter will be referred to as a HDD), a technique capable of achieving an information recording density on the order of 40 $Gbit/inch^2$ to 100 $Gbit/inch^2$ or more is required in order to meet the demand for a higher storage capacity.

Following the above-mentioned demand for a higher storage capacity, the magnetic disk is required to be excellent particularly in magnetic characteristic in a flying/tracking direction of a magnetic head of the HDD. For this purpose, it is proposed in Japanese Patent Application Publication (JP-A) No. S62-273619 to deposit a magnetic layer on a metal substrate (for example, an aluminum alloy substrate) as a substrate for a magnetic disk after a texture for inducing magnetic anisotropy in the magnetic layer is formed on the surface of the substrate. With this structure, it is possible to improve the magnetic characteristic in the flying/tracking direction of the magnetic head in comparison with the magnetic characteristic in a radial direction.

On the other hand, in order to meet the recent demand for a mobile and small-sized HDD, attention is recently drawn to a glass substrate for use as the substrate for a magnetic disk. The glass substrate is high in rigidity, excellent in shock resistance, and high in surface flatness and smoothness. Since the glass substrate is excellent in shock resistance by replacing the aluminum alloy by the glass as the material of the magnetic disk, it is unnecessary in a magnetic disk production process to enhance the rigidity by coating the substrate with a metal film such as a NiP film as required in the aluminum alloy substrate. As a result, the magnetic disk production process is shortened and the magnetic disk is provided at a low cost. In addition, the HDD is easily reduced in size. For example, Japanese Patent Application Publication (JP-A) No. 2002-32909 proposes a magnetic recording medium comprising a glass substrate provided with a circular texture and a magnetic layer formed on the substrate by sputtering.

In case where the glass substrate is used as the substrate for a magnetic disk, it is desired, like in the aluminum alloy substrate, that the magnetic characteristic in a circumferential direction as the flying/tracking direction of the magnetic head is more excellent than that in the radial direction.

In order to evaluate the magnetic characteristics of the magnetic disk in the radial direction and in the circumferential direction, use is made of an oriented ratio of magnetic anisotropy (hereinafter referred to as MrtOR) calculated from a residual magnetization-thickness product.

MrtOR represents the oriented ratio (OR) of magnetic anisotropy calculated from the residual magnetization-thickness product (Mrt). At any given point on a principal surface of a magnetic recording medium such as a magnetic disk, Mrt in the circumferential direction is represented by Mrt(c) while Mrt in the radial direction is represented by Mrt(r). MrtOR is defined as Mrt(c)/Mrt(r) as a ratio of Mrt(c) with respect to Mrt(r). Mrt is a product of Mr (residual magnetization) and t (thickness of the magnetic layer of the medium).

If MrtOR is substantially equal to 1 in a magnetic recording medium such as a magnetic disk, the magnetic characteristic in the circumferential direction is substantially same as that in the radial direction. In this event, the magnetic recording medium is isotropic. As MrtOR becomes greater beyond 1, the magnetic anisotropy as the magnetic characteristic in the circumferential direction is improved or increased.

In order to achieve a recording density of 40 $Gbit/inch^2$ or more in the magnetic disk, it is required that MrtOR is not smaller than 1.2. In order to achieve a recording density of 50 $Gbit/inch^2$ or more, it is desired that MrtOR is not smaller than 1.3. In order to achieve a recording density of 60 $Gbit/inch^2$ or more, it is desired that MrtOR is not smaller than 1.35.

MrtOR in a desired range can be obtained in case where an aluminum alloy substrate or a substrate coated with a metal film such as NiP is used as a substrate for a magnetic disk, a texture for inducing magnetic anisotropy is formed on its metallic surface, and a magnetic layer is formed on the substrate.

On the other hand, in case where a glass substrate is used as a substrate for a magnetic disk, a texture for inducing magnetic anisotropy is formed directly on its glass surface, and a magnetic layer is formed on the substrate, MrtOR is no more than 1.0 to 1.1. Thus, the glass substrate is not appropriate for a higher recording density. As a consequence, the glass substrate can not be used as a substrate for a magnetic disk in order to achieve the objects of a reduction of the HDD in size, an increase in storage capacity, and a decrease in cost. Thus, the advantages of the glass substrate, such as the excellent shock resistance, the high surface flatness and smoothness, and the cost saving effect can not be utilized. This constitutes a factor of inhibiting achievement of the above-mentioned objects.

SUMMARY OF THE INVENTION

It is therefore an object of this invention to provide a magnetic disk which is increased in shock resistance and reduced in production cost by the use of a glass substrate and which has a desired magnetic characteristic.

This invention has following aspects.

First Aspect

A magnetic disk comprising a glass substrate, an amorphous underlayer formed on the glass substrate as a disk substrate, and a magnetic layer formed on the amorphous underlayer;

the glass substrate being provided with a texture formed thereon to induce magnetic anisotropy in the magnetic layer;

the amorphous underlayer containing a group IVa element on the side of the glass substrate and a group Va element on the side of the magnetic layer.

The magnetic disk having the above-mentioned aspect uses the glass substrate as a disk substrate and yet is capable of inducting high magnetic anisotropy in the magnetic layer. Therefore, the magnetic disk having a desired magnetic characteristic is obtained.

Second Aspect

In the magnetic disk according to the first aspect, a seed layer having a B2 crystal structure is formed between the amorphous underlayer and the magnetic layer.

The magnetic disk having the second aspect is suitable for an increase in recording density because magnetic grains of the magnetic layer are uniform and reduced in size in addition to the effect of the first aspect.

Third Aspect

In a magnetic disk according to the first aspect, the group IVa element is Ti and/or Zr; and the group Va element is Nb and/or Ta.

In order to effectively achieve the effect of the first aspect, Ti and/or Zr is advantageously selected as the group IVa element while Nb and/or Ta is advantageously selected as the group Va element.

Fourth Aspect

In a magnetic disk according to the first aspect, the amorphous underlayer is a layer containing an amorphous Cr alloy.

In order to effectively achieve the effect of the first aspect, the layer containing an amorphous Cr alloy is advantageously selected as the amorphous underlayer.

Fifth Aspect

A magnetic disk according to the first aspect, the magnetic layer contains an exchange coupling film.

The magnetic disk having the fifth aspect is capable of suppressing a thermal fluctuation error in the magnetic layer due to thermal magnetic aftereffect in addition to the effect of the first aspect and is therefore suitable for an increase in recording density.

BRIEF DESCRIPTION OF THE DRAWINGS

Sole FIGURE is a schematic vertical sectional view of a magnetic disk according to an embodiment of this invention.

DESCRIPTION OF THE PREFERRED EMBODIMENT

In case of a magnetic disk comprising a glass substrate provided with a texture, magnetic anisotropy induced in a magnetic layer is small as compared with a magnetic disk comprising a metal substrate provided with a texture. The present inventors have made extensive study from various angles about the reason for such small magnetic anisotropy associated with the glass substrate for the purpose of inducing sufficient magnetic anisotropy in the magnetic layer by the use of the glass substrate. As a result of the study, the inventors reached an idea as follows: The glass substrate is a nonmetal material and contains an amorphous component. If an underlayer adapted for the surface property of the glass substrate is selected and formed in contact with the glass substrate, the underlayer will advantageously transfer the effect of the texture formed on the surface of the glass substrate to the magnetic layer. Based on the idea, the present inventors earnestly and diligently pursued the study. As a result, the present inventors found out a suitable underlayer capable of inducing sufficient magnetic anisotropy in the magnetic layer although the glass substrate is used. Thus, this invention has been completed.

Now, one embodiment of this invention will be described with reference to the drawing.

Referring to FIG. 1, a magnetic disk 10 according to one embodiment of this invention comprises a glass substrate 1 on which an amorphous underlayer 2, a seed layer 3, an orientation control layer 4, a magnetic layer 5, a protection layer 6, and a lubrication layer 7 are successively laminated in this order.

The amorphous underlayer 2 comprises a first amorphous underlayer 2a and a second amorphous underlayer 2b laminated thereon.

The magnetic layer 5 comprises a first magnetic layer 5a, an exchange coupling film 5b, and a second magnetic layer 5c successively laminated. The first and the second magnetic layers 5a and 5c are antiparallel exchange-coupled through the exchange coupling film 5b as a nonmagnetic layer.

Although not shown in the figure, the glass substrate 1 is provided with a circular texture for inducing circumferential magnetic anisotropy in the magnetic layer 5.

Hereinafter, each layer will be described in detail.

Glass Substrate

As a glass material for use as a substrate for a magnetic disk according to this invention, use may be made of, for example, an aluminosilicate glass or a soda lime glass. Among them, the aluminosilicate glass is preferable because a high rigidity is obtained if it is chemically strengthened into a chemically strengthened glass. Further, the glass material may be an amorphous glass or a crystallized glass containing an amorphous component and crystals. The amorphous glass advantageously achieves the effect of this invention.

As an amorphous aluminosilicate glass, use is preferably made of an aluminosilicate glass essentially consisting of 58–75 wt % $SiO_2$, 5–23 wt % $Al_2O_3$, 3–10 wt % $Li_2O$, and 4–13 wt % $Na_2O$. Further, use is preferably made of an aluminosilicate glass essentially consisting of 62–75 wt % $SiO_2$, 5–15 wt % $Al_2O_3$, 4–10 wt % $Li_2O$, 4–12 wt % $Na_2O$, and 5.5–15 wt % $ZrO_2$ with the weight ratio of $Na_2O/ZrO_2$ being 0.5–2.0 and the weight ratio of $Al_2O_3/ZrO_2$ being 0.4–2.5.

If a chemically-strengthenable glass essentially consisting of, by mol %, 57–74% $SiO_2$, 0–2.8% $ZnO_2$, 3–15 $Al_2O_3$, 7–16 $Li_2O$, and 4–14 possible to avoid occurrence of protrusions on the surface of the glass substrate resulting from an undissolved portion of $ZrO_2$.

By chemically strengthening the above-mentioned aluminosilicate glass, the glass substrate is improved in transverse strength, increased in depth of a compressive stress layer, and excellent in Knoop hardness.

The texture formed on the glass substrate is not specifically limited in shape as far as the magnetic anisotropy is induced in the magnetic layer. For example, a circular texture, a spiral texture, and a cross texture may be used. Among them, the circular texture advantageously achieves the effect of this invention because the direction of the texture is similar to the tracking direction of a magnetic head flying over the magnetic disk.

As regards the surface roughness, the substrate preferably has a flat and smooth surface having Rmax of 6 nm or less and Ra of 0.6 nm or less. The flat and smooth surface having the surface roughness in the above-mentioned range contributes to an increase in recording density. Herein, the surface roughness Rmax is defined in Japanese Industrial Standard JIS B0601 as a maximum height representative of a difference between a highest point and a lowest point of the surface and described, for example, in U.S. Pat. No. 6,544,893B2. The surface roughness Ra is also defined in Japanese Industrial Standard JIS B0601 as an arithmetic average roughness or a center-line-mean roughness and described in U.S. Pat. No. 6,544,893B2.

Amorphous Underlayer

The amorphous underlayer 2 is formed between the glass substrate 1 and the magnetic layer 5. The amorphous under layer 2 contains a group IVa element added on the side of the glass substrate 1 and a group Va element added on the side of the magnetic layer 5. By providing the amorphous underlayer 2, it is possible to induce high magnetic anisotropy in the magnetic layer 5. The mechanism is not yet known exactly but is supposed as follows.

At first, it is supposed that, by depositing the amorphous underlayer 2 on the glass substrate 1 in conformity with the surface property of the glass substrate 1 containing an amorphous component, the texture formed on the glass substrate 1 is transferred to a metallic surface of the amorphous underlayer 2 or the magnetic layer 5 without disturbing microscopic morphology of the texture. From this point of view, the amorphous underlayer 2 is preferably deposited in contact with the glass substrate 1.

Second, it is supposed that, by adding the group IVa element on the side of the glass substrate and the group Va element on the side of the magnetic layer 5, film stress caused by the morphology of the texture is suitably transferred to the magnetic layer 5.

According to the knowledge in physics of magnetics, the magnetic anisotropy of a magnetic material mainly originates from an easy magnetization axis depending upon magnetocrystalline anisotropy. For example, in case where the magnetic layer is made of a material containing a Co-based alloy, a c-axis of a hcp crystal structure serves as the easy magnetization axis according to the magnetocrystalline anisotropy. Consequently, the magnetic anisotropy is exhibited in a direction of the c-axis. However, if the crystal structure is applied with strain such as stress, the magnetocrystalline anisotropy is changed as known in the art. Generally, this phenomenon is described as magnetostriction by the Villari effect.

Thus, the magnetic anisotropy of the magnetic layer induced by the texture is supposed to be developed by the stress applied by the texture to the magnetic layer as one of the factors.

In this invention, the texture on the glass substrate 1 acts upon a metal layer such as the amorphous underlayer 2 or the magnetic layer 5 formed on the glass substrate 1 and serves to control the orientation of the grains and to induce the magnetic anisotropy owing to the magnetostriction.

Further, in this invention, the group IVa element is added to the amorphous underlayer 2 on the side of the glass substrate 1 while the group Va element is added on the side of the magnetic layer 5. Therefore, the lattice distance as short-range order in the amorphous underlayer 2 is increased from the side of the glass substrate 1 towards the side of the magnetic layer 5. Therefore, it is supposed that the film stress induced by the texture in the amorphous underlayer 2 on the side of the glass substrate 1 is amplified in the amorphous underlayer 2 and transferred towards the magnetic layer 5. As a result, it is possible to induce high magnetic anisotropy in the magnetic layer 5.

As a material of the amorphous underlayer 2, an amorphous Cr alloy material is preferable because high magnetic anisotropy is induced in the magnetic layer 5. Presumably, this is because the amorphous underlayer 2 containing the amorphous Cr alloy material advantageously transfers the film stress to the magnetic layer 5. Supposedly, this is because the amorphous Cr alloy material is an amorphous material by the absence of long-range order but has a nanocrystal structure with short-range order.

Therefore, in this invention, the amorphous Cr alloy material or the like is used as the material of the amorphous underlayer 2. In order that the lattice distance as the short-range order in the amorphous underlayer 2 is increased from the side of the glass substrate 1 towards the side of the magnetic layer 5, the group IVa element is added on the side of the glass substrate 1 and the group Va element is added on the side of the magnetic layer 5. As a consequence, the film stress induced by the texture in the amorphous underlayer 2 on the side of the glass substrate 1 is amplified in the amorphous underlayer 2 and transferred towards the magnetic layer 5. Thus, high magnetic anisotropy can be induced in the magnetic layer 5.

In this invention, the content of the group IVa element and the group Va element in the amorphous underlayer 2 is preferably between 35 at % and 65 at %. In case where the amorphous underlayer 2 is made of a material containing an amorphous Cr alloy (the amorphous Cr alloy material), the material advantageously has a nanocrystal structure if the content of those elements falls within the above-mentioned range.

In this invention, the thickness of the amorphous underlayer 2 may appropriately be selected within a range such that the effect of this invention is not lost. For example, the thickness between 100 Å and 500 Å is preferable in view of the characteristic and the productivity.

In this invention, it is preferable to select Ti and/or Zr as the group IVa element and Nb and/or Ta as the group Va element. In particular, in case where the amorphous underlayer 2 is made of the material containing an amorphous Cr alloy (the amorphous Cr alloy material) and if these elements are contained in the amorphous underlayer 2, the amorphous underlayer 2 has an excellent nanocrystal structure and high magnetic anisotropy is induced in the magnetic layer 5.

As a preferred embodiment of the amorphous underlayer 2, the first amorphous underlayer 2a comprising a CrTi alloy and/or a CrZr alloy is deposited on the glass substrate 1 in contact therewith. On the first amorphous underlayer 2a, the second amorphous underlayer 2b comprising a CrNb alloy and/or a CrTa alloy is deposited.

If the CrTi alloy or the CrZr alloy is deposited as the first amorphous underlayer 2a in contact with the glass substrate 1, these alloys are small in film stress as compared with the CrNb alloy and the CrTa alloy but are excellent in adhesion with the glass substrate 1 because of the small film stress. High adhesion between the glass substrate 1 and the amorphous underlayer 2 makes it possible to suppress the amorphous underlayer 2 from being peeled or separated from the glass substrate 1. On the other hand, the CrNb alloy or the CrTa alloy as the second amorphous underlayer 2b on the side of the magnetic layer 5 is greater in film stress than the CrTi alloy and the CrZr alloy and is able to induce high magnetic anisotropy in the magnetic layer 5.

With the above-mentioned structure, it is possible to obtain the magnetic disk 10 having high magnetic anisotropy and free from the problem in adhesion, such as film peeling. In particular, in a magnetic disk for use in a HDD of a load/unload (hereinafter abbreviated to LUL) system, film peeling often occurs due to the impact applied from a magnetic head to the magnetic disk upon LUL operations. On the other hand, the magnetic disk according to this invention assures high film adhesion and therefore has a high durability. Thus, the magnetic disk according to this invention is suitable for use as the magnetic disk for the LUL system.

Seed Layer

In this invention, the seed layer 3 having a B2 crystal structure is preferably formed between the amorphous underlayer 2 and the magnetic layer 5. The amorphous underlayer 2 containing the Cr alloy acts upon the seed layer 3 of the B2 crystal structure so that crystal grains of the seed layer 3 are uniform and small in size. The seed layer 3 of the B2 crystal structure which is uniform and small in grain size makes magnetic grains of the magnetic layer 5 formed thereon have a uniform and small size. The magnetic grains of the magnetic layer 5 being uniform and small in size contributes to an increase in recording density of the magnetic disk 10 to be obtained. As the seed layer 3 of the type, an AlRu alloy seed layer, an NiAl alloy seed layer, and so on may be used. In order to advantageously exhibit the effect of this invention, the seed layer 3 of an AlRu alloy is preferably formed in contact with the amorphous underlayer 2 of the Cr alloy.

Orientation Control Layer

In this invention, it is preferable to form the orientation control layer 4 between the seed layer 3 and the magnetic layer 5 or between the amorphous underlayer 2 and the magnetic layer 5 if the seed layer 3 is not provided. Presence of the orientation control layer 4 promotes the orientation of the easy magnetization axis of the magnetic layer 5.

In case where the magnetic disk 10 to be produced is a magnetic disk for in-plane magnetic recording, a crystalline layer having a bcc crystal structure is preferably formed as the orientation control layer 4 so as to achieve in-plane orientation of the magnetic layer 5. As the crystalline layer having the bcc crystal structure, use is preferably made of, for example, a CrW alloy layer, a CrMo alloy layer, and a CrV alloy layer.

Magnetic Layer

The magnetic layer 5 in this invention may be made of a magnetic material selected from various kinds of materials. Among them, a magnetic layer containing a Co alloy is preferable and a crystalline magnetic layer having a hcp crystal structure is preferable. As the magnetic layer 5 of the type, use is preferably made of, for example, a CoCr alloy magnetic layer, a CoPt alloy magnetic layer, and a CoCrPt alloy magnetic layer. The magnetic layer 5 containing the above-mentioned alloy material has a high magnetic anisotropy constant and therefore achieves high magnetic anisotropy. The thickness of the magnetic layer 5 may appropriately be selected and, for example, preferably falls between 50 Å and 300 Å in view of the characteristic and the productivity.

In this invention, it is preferable that the magnetic layer 5 comprises the exchange coupling film 5b and that the first magnetic layer 5a, the exchange coupling film 5b, and the second magnetic layer 5c are laminated in this order from the side of the glass substrate 1. When the magnetic layer 5 has the exchange coupling film 5b, it is possible to suppress a thermal fluctuation error in the magnetic disk 10 due to thermal magnetic aftereffect. Thus, the structure including the exchange coupling film 5b is suitable for an increase in recording density. In particular, it is preferable to control coupling between the first and the second magnetic layers 5a and 5c so that the first magnetic layer 5a has a magnetization direction antiparallel to that of the second magnetic layer 5c. Such control can be achieved by the use of a nonmagnetic layer having a thickness between 5 Å and 10 Å as the exchange coupling film 5b interposed between the first and the second magnetic layers 5a and 5c. As the nonmagnetic layer, use is preferably made of, for example, a Ru layer having a hcp crystal structure.

Protection Layer and Lubrication Layer

In this invention, it is preferable to form the protection layer 6 and the lubrication layer 7 on the magnetic layer 5. As the protection layer 6, a carbon-based protection layer is preferable. As the lubrication layer 7, a perfluoropolyether (PFPE) lubrication layer is preferable.

Hereinafter, this invention will be described in detail in conjunction with specific examples.

EXAMPLE 1

The glass substrate 1 was a 2.5-inch chemically strengthened glass substrate obtained by melting an amorphous aluminosilicate glass into a molten glass, forming the molten glass into a glass disk by direct pressing, and subjecting the glass disk to shaping, grinding, polishing, and chemical strengthening.

The aluminosilicate glass in this example had a composition of 63.6 wt % $SiO_2$, 14.2 wt % $Al_2O_3$, 10.4 wt % $Na_2O$, 5.4 wt % $Li_2O$, 6.0 wt % $ZrO_2$, and 0.4 wt % $Sb_2O_3$.

On a principal surface of the glass substrate 1 after chemical strengthening, a circular texture was formed by the use of a single-substrate tape texturing apparatus and diamond slurry.

In the glass substrate 1 provided with the texture, microscopic morphology in a 5 μm-square area on the principal surface was observed by the use of an atomic force microscope (AFM). It was confirmed that the texture comprising regular striped grooves is arranged along a circumferential direction of the disk.

On the other hand, the principal surface was a flat and smooth surface having surface roughness of 4.81 nm in Rmax and 0.42 nm in Ra. The surface roughness was calculated according to the Japanese Industrial Standard (JIS) based on the shape observed by the AFM.

Next, by the use of a single-substrate fixed-target deposition method, the respective layers were deposited on the glass substrate 1 in an Ar gas atmosphere by DC magnetron sputtering.

The first amorphous underlayer 2a was an amorphous Cr alloy layer containing CrTi (Cr: 55 at %, Ti: 45 at %) and was deposited to the thickness of 100 Å.

The second amorphous underlayer 2b was an amorphous Cr alloy layer containing CrNb (Cr: 55 at %, Nb: 45 at %) and was deposited to the thickness of 200 Å.

As a result, the amorphous underlayer 2 had a thickness of 300 Å.

Then, the glass substrate 1 with the amorphous underlayer 2 formed thereon was heated. Subsequently, deposition was carried out as follows.

The seed layer 3 was an alloy layer containing AlRu (Al: 50 at %, Ru: 50 at %) and having a B2 crystal structure and was deposited to the thickness of 300 Å.

The orientation control layer 4 was a crystalline layer containing CrMo (Cr: 80 at %, Mo: 20 at %) and having a bcc crystal structure and was deposited to the thickness of 100 Å. The orientation control layer 4 serves to control the orientation of the magnetic layer 5 so that the easy magnetization axis of the magnetic layer 5 is oriented in the plane of the magnetic disk 10.

The first magnetic layer 5a was a magnetic layer containing a ferromagnetic alloy of CoCrTa (Co: 85 at %, Cr: 10 at %, Ta: 5 at %) and having a hcp crystal structure and was deposited to the thickness of 30 Å.

In order to induce antiferromagnetic exchange coupling between the first and the second magnetic layers 5a and 5c, the exchange coupling film 5b was a nonmagnetic layer having a hcp crystal structure and containing a Ru metal and was deposited to the thickness of 7 Å.

As a main magnetic recording part, the second magnetic layer 5c was a magnetic layer containing a ferromagnetic alloy of CoCrPtB (Co: 61 at %, Cr: 16 at %, Pt: 13 at %, B: 10 at %) and having a hcp crystal structure and was deposited to the thickness of 200 Å.

As a result, the magnetic layer 5 had a thickness of 237 Å.

The protection layer 6 for protecting the magnetic layer 5 (the second magnetic layer 5c) from the impact of the magnetic head was a hydrogenated carbon layer. The protection layer 6 was deposited to the thickness of 45 Å in a sputtering atmosphere comprising a mixture of Ar and hydrogen.

After the deposition mentioned above, a polymer compound containing PFPE was applied onto the surface of the magnetic disk 10 by dipping to form the lubrication layer 7. Thus, the magnetic disk 10 was obtained. The lubrication layer 7 was a layer for mitigating the impact of the magnetic head upon the magnetic disk 10 and had a thickness of 10 Å.

The magnetic disk 10 thus obtained was observed in section by the use of a transmission electron microscope (TEM). As a result, the amorphous underlayer 2 had an amorphous structure without long-range order but short-range order was observed. In other words, it was confirmed that the amorphous underlayer 2 had an amorphous body with a nanocrystal structure.

Next, MrtOR of the magnetic disk 10 as the magnetic characteristic was evaluated by the use of a vibrating sample magnetometer (VSM). The result is shown in Table 1 as a characteristics list of the magnetic disk according to this invention.

In addition, a magnetization curve was confirmed. As a result, antiparallel exchange coupling between the first and the second magnetic layers 5a and 5c was confirmed.

Next, the recording/reproducing characteristics (R/W (Read/Write) characteristics) of the magnetic disk 10 was evaluated. Evaluation was carried out in the following manner. By the use of a GMR (giant magnetoresistive) head having a flying height of 12 nm, the reproduction output at a linear recording density of 700 kFCI (kilo flux changes per inch) and medium noise were measured. The S/N ratio was calculated as the ratio between the reproduction output and the medium noise. The result is also shown in Table 1.

Further, in order to examine the reliability of the magnetic disk 10, a LUL durability test was carried out by the use of a HDD of a LUL system. Generally, a magnetic disk for a LUL system is required to withstand consecutive 400,000 times of LUL operations or more. The magnetic disk 10 in this example withstood 600,000 times of LUL operations without any failure. After the LUL durability test, the magnetic disk 10 was taken out from the HDD and observed. As a result, no abnormality such as film peeling was observed. The result is also shown in Table 1.

EXAMPLE 2

In Example 2, the magnetic disk was produced in the manner similar to Example 1 except that a CrZr alloy layer was used as the first amorphous underlayer 2a instead of the CrTi alloy layer. The CrZr alloy layer had a composition of 55 at % Cr and 45 at % Zr.

The magnetic disk obtained in Example 2 was observed and tested in the manner similar to Example 1.

As a result, it was confirmed that the amorphous underlayer had an amorphous body with a nanocrystal structure and that antiparallel exchange coupling was caused between the first and the second magnetic layers.

The results of evaluation of the magnetic characteristic and evaluation of the recording/reproducing characteristics are shown in Table 1.

In the LUL durability test, the magnetic disk withstood 600,000 times of LUL operations without any failure. In the magnetic disk after the durability test, no abnormality such as film peeling was observed. The result is also shown in Table 1.

COMPARATIVE EXAMPLE 1

The magnetic disk was produced in the manner similar to Example 1 except that the second amorphous underlayer 2b was not formed. It is noted here that the first amorphous underlayer 2a had a thickness of 300 Å so that the thickness of the amorphous underlayer 2 was equal to that in Example 1.

The magnetic disk obtained in Comparative Example 1 was observed and tested in the manner similar to Example 1.

As a result, it was confirmed that the amorphous underlayer had an amorphous body with a nanocrystal structure and that antiparallel exchange coupling was caused between the first and the second magnetic layers.

The results of evaluation of the magnetic characteristic and evaluation of the recording/reproducing characteristics are shown in Table 1.

In the LUL durability test, the magnetic disk withstood 600,000 times of LUL operations without any failure. In the magnetic disk after the durability test, no abnormality such as film peeling was observed. The result is also shown in Table 1.

TABLE 1

| | amorphous underlayer | | magnetic characteristic | recording/ reproducing characteristics | LUL durability test | |
|---|---|---|---|---|---|---|
| | 1st | 2nd | MrtOR | S/N (d/B) | number of times of LUL operations | result of observation |
| Example 1 | CrTi | CrNb | 1.37 | 27.4 | withstood 600,000 times | good |
| Example 2 | CrZr | CrNb | 1.31 | 27.1 | withstood 600,000 times | good |
| Comparative Example 1 | CrTi | — | 1.10 | 24.5 | withstood 600,000 times | good |
| Comparative Example 2 | — | CrNb | 1.19 | 25.2 | failed at 200,000 times | film peeling occurred |

COMPARATIVE EXAMPLE 2

The magnetic disk was produced in the manner similar to Example 1 except that the first amorphous underlayer 2a was not formed. It is noted here that the second amorphous underlayer 2b had a thickness of 300 Å so that the thickness of the amorphous underlayer 2 was equal to that in Example 1.

The magnetic disk obtained in Comparative Example 2 was observed and tested in the manner similar to Example 1.

As a result, it was confirmed that the amorphous underlayer had an amorphous body with a nanocrystal structure and that antiparallel exchange coupling was caused between the first and the second magnetic layers.

The results of evaluation of the magnetic characteristic and evaluation of the recording/reproducing characteristics are shown in Table 1.

In the LUL durability test, film peeling occurred in the magnetic disk at 200,000 times of LUL operations. The result is also shown in Table 1.

From the results in Examples 1 and 2 and Comparative Examples 1 and 2, the following has been revealed.

By forming the amorphous underlayer and the magnetic layer on the glass substrate provided with the appropriate texture and making the amorphous underlayer contain the group IVa element on the side of the glass substrate and the group Va element on the side of the magnetic layer, it is possible to produce the magnetic disk which has high magnetic anisotropy (MrtOR) as the magnetic characteristic suitable for an increase in recording density and which has high LUL durability.

According to this invention, the magnetic disk comprises the glass substrate with the amorphous underlayer and the magnetic layer formed thereon. The glass substrate is provided with the texture for inducing the magnetic anisotropy in the magnetic layer. The amorphous underlayer contains the group IVa element on the side of the glass substrate and the group Va element on the side of the magnetic layer. With this structure, it is possible to induce high magnetic anisotropy in the magnetic layer although the glass substrate is used as a disk substrate and to obtain the magnetic disk having a desired magnetic characteristic.

While this invention has thus far been described in conjunction with a few preferred embodiments or examples thereof, it will be readily possible for those skilled in the art to put this invention into practice in various other manners.

What is claimed is:

1. A magnetic disk having a glass substrate, comprising:
   an amorphous underlayer formed on the glass substrate; and
   a magnetic layer formed on the amorphous underlayer;
   the glass substrate being provided with a texture formed to induce magnetic anisotropy in the magnetic layer;
   wherein the amorphous underlayer is formed immediately above the glass substrate provided with the texture, and
   the amorphous underlayer comprises a first amorphous layer made of a first material comprising at least one of Ti or Zr added to Cr and a second amorphous layer made of a second material comprising at least one of Nb and Ta added to Cr, the second amorphous layer being formed directly on the first amorphous layer.

2. A magnetic disk according to claim 1, further comprising:
   a seed layer which has a B2 crystal structure and which is formed between the amorphous underlayer and the magnetic layer.

3. A magnetic disk according to claim 1, wherein:
   the magnetic layer includes an exchange coupling film.

4. A magnetic disk according to claim 1, wherein:
   the magnetic disk is loaded in a hard drive of a load/unload system.

* * * * *